Aug. 11, 1936.   W. L. DEAN ET AL   2,050,964
FRUIT AND VEGETABLE WASHER
Filed Jan. 23, 1933   4 Sheets-Sheet 3
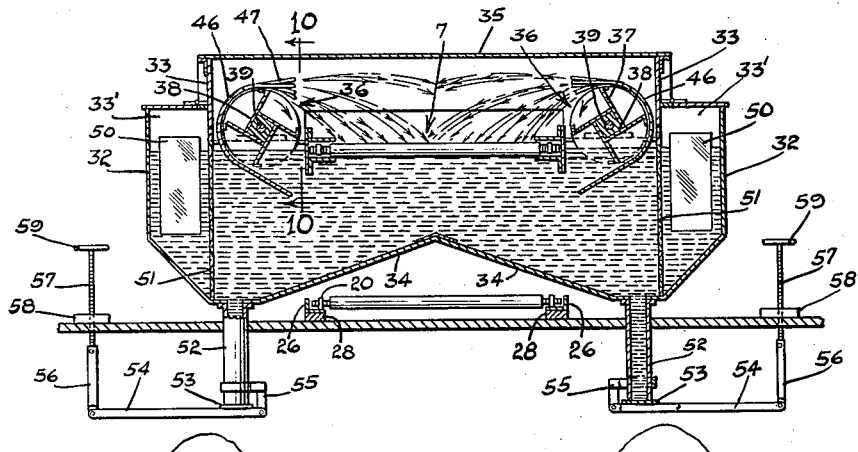
Fig. 6
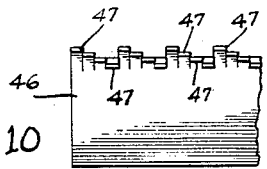
Fig. 10
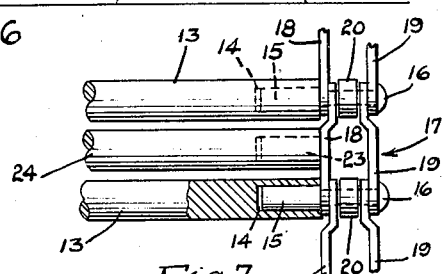
Fig. 7
Fig. 8
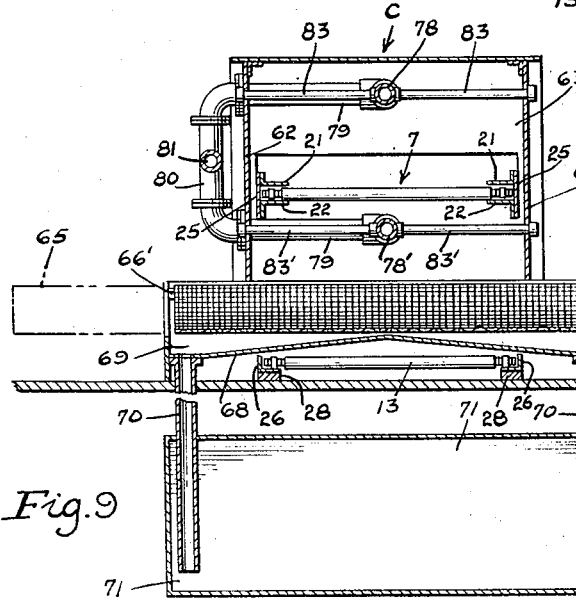
Fig. 9
INVENTORS
WILLIAM L. DEAN
FRANK S. LAMPARD
By Paul Paul Moore
ATTORNEYS Aug. 11, 1936.      W. L. DEAN ET AL      2,050,964
FRUIT AND VEGETABLE WASHER
Filed Jan. 23, 1933      4 Sheets-Sheet 4

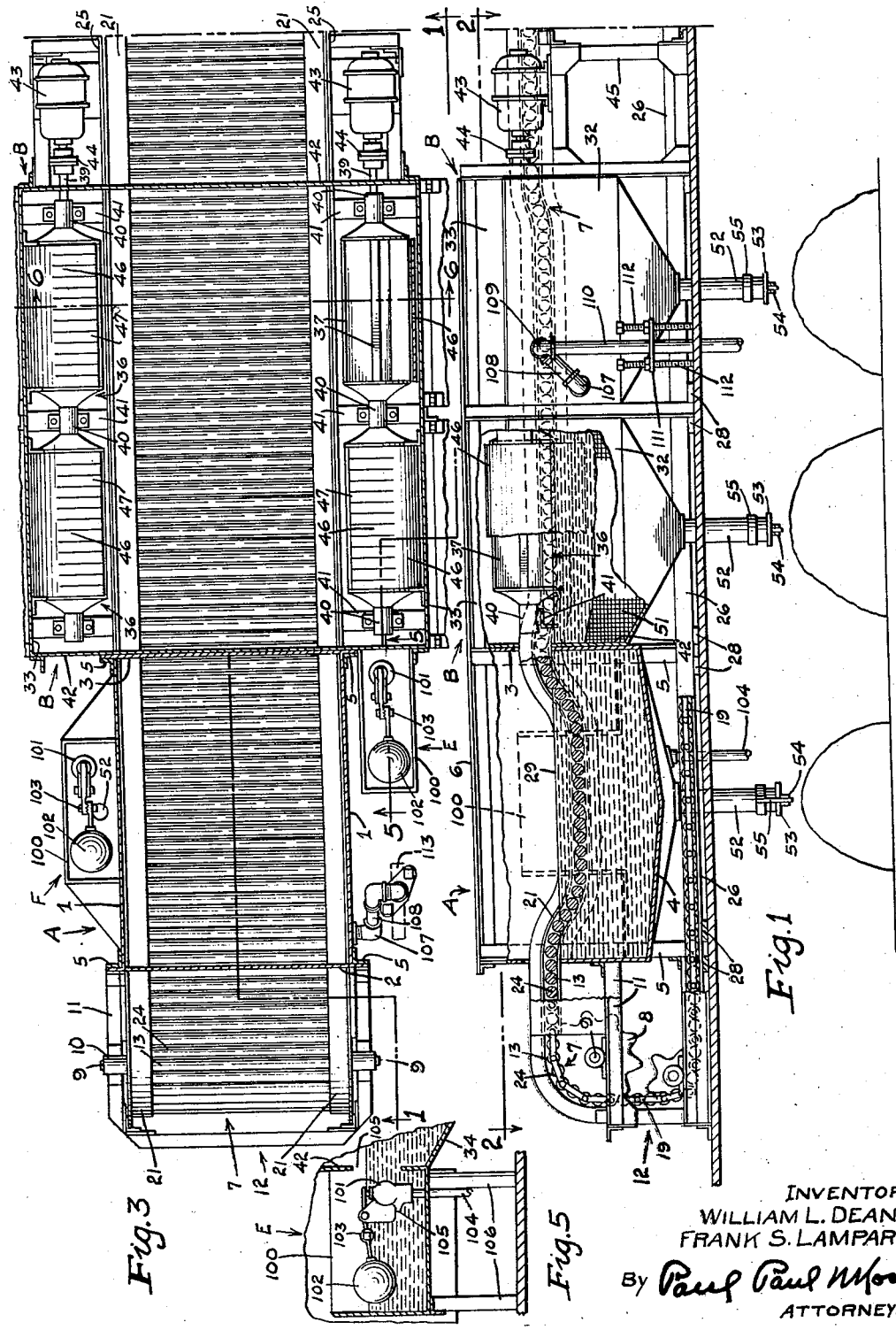

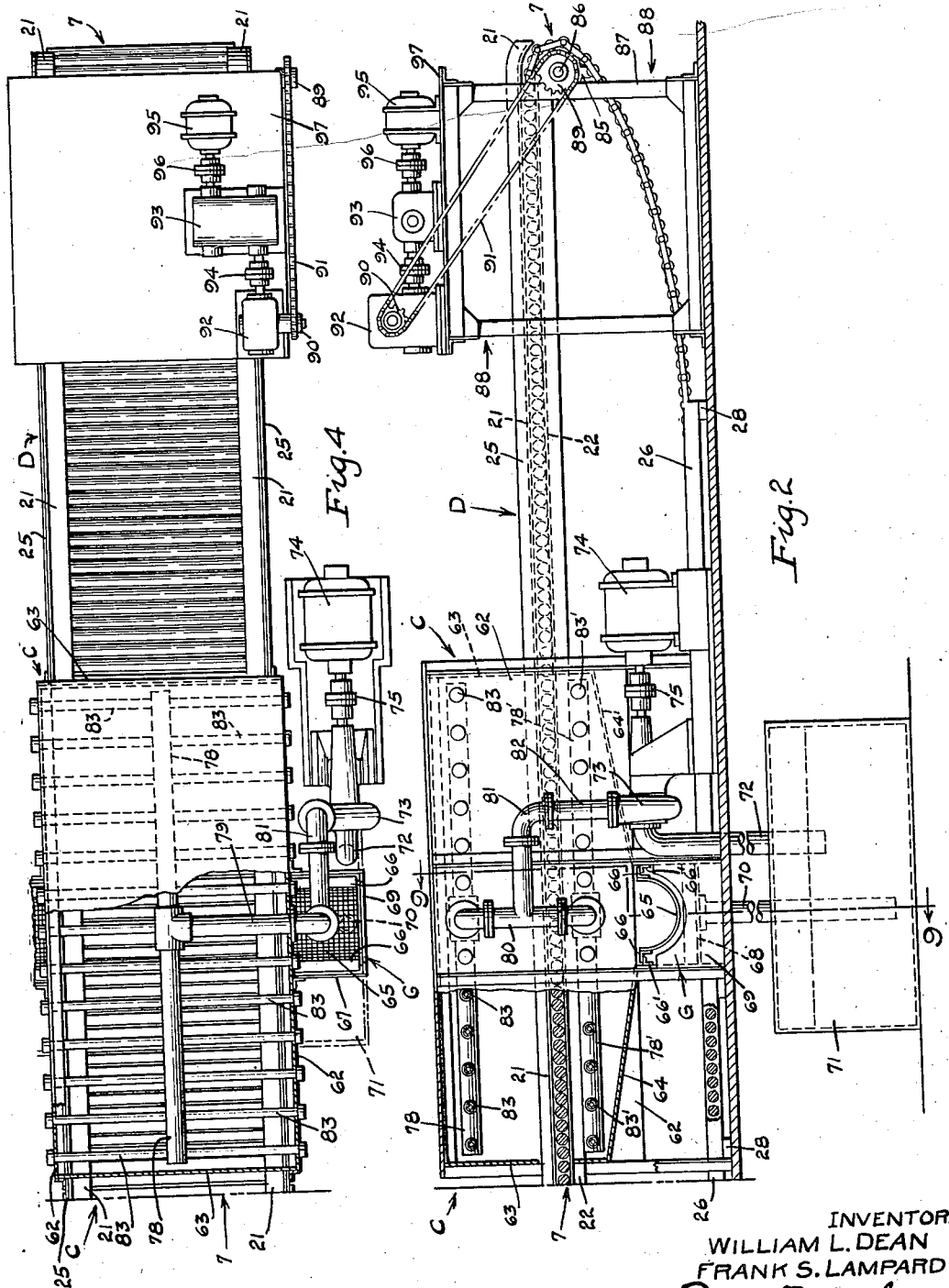

INVENTORS
WILLIAM L. DEAN
FRANK S. LAMPARD
By Paul Paul & Moore
ATTORNEYS

Patented Aug. 11, 1936

2,050,964

UNITED STATES PATENT OFFICE 2,050,964

FRUIT AND VEGETABLE WASHER

William L. Dean and Frank S. Lampard, Ellwood City, Pa., assignors to Mathews Conveyer Company, Ellwood City, Pa., a corporation of Pennsylvania Application January 23, 1933, Serial No. 652,984

5 Claims. (Cl. 146—194)

This invention relates to new and useful improvements in washing apparatus adapted for use in the process of preparing fruits and vegetables in large quantities for the market, and it relates more particularly to a machine which may be used for washing potatoes, carrots, beets, turnips, radishes, bunched onions, spinach, parsley, celery, and other vegetables, for the purpose of removing therefrom field soil, sand, or other foreign substances which may adhere to the surface of the vegetables when they are removed from the ground so that the vegetables will be clean and attractive in appearance, when placed on the market. The machine is also adapted for washing citrus and deciduous fruits to remove spray residue resulting from the spraying of the fruit during growth, and for removing other foreign substances.

Washers of this type are generally used in packing sheds, where fruit and vegetables are brought in large quantities from the surrounding orchards and farms. In these sheds the fruit and vegetables are washed, graded and packed, and immediately placed either in waiting railroad cars for transportation to the market, or in cooling rooms when storage is necessary. Inasmuch as the vegetables are of a perishable nature, and the fruits are subject to mould and decay which rapidly takes place, it is desirable that the preparation of fruit and vegetables for the market be facilitated by a high capacity washer which will operate efficiently and with a minimum loss of washing water.

It has been found from experimentation with many vegetables that the most efficient method of cleansing them consists of two or more stages of washing. For instance, in washing potatoes in a washer of the type disclosed in this invention, ninety per cent (90%) of the field soil and mud is washed off in the first stage, which consists of an impeller section designed to project a surging mass of water over and around the vegetables. After passing through this stage the vegetables are rinsed by spray sections for removing the remaining ten per cent (10%) of the foreign matter. For washing large quantities of fruits and vegetables as, for example, twenty carloads per day, two or more impeller sections are used and the transporting belt of the machine is operated at a relatively high speed.

To successfully remove the spray residue from fruit in the process of preparing fruit for the market, it is generally necessary that the washing medium be a solution which will dissipate and remove the spray residue. The solution should also be capable of destroying or sterilizing bacteria and aiding in the prevention of mould and decay. To facilitate this we provide a soaking tank at the receiving end of the washer, which may contain a suitable solution through which the fruit passes before being received into the first washing section.

The primary object of this invention is to provide a universal washer particularly adapted for washing fruits and vegetables, wherein the articles to be cleansed are transported through a plurality of washing stages in such a manner that substantially all of the soil, mud, and other foreign substances adhering thereto, is removed from the surfaces and leaves thereof without the use of brushes or other scrubbing means, which might injure the cuticle of the fruits and vegetables or tear the leaves and stocks thereof.

A further object of the invention is to provide a fruit and vegetable washer capable of removing from fruit and vegetables, a high percent of the foreign matter which may be adhering thereto, such removal of foreign matter being accomplished by subjecting the fruit and vegetables to the action of great volumes of water projected thereagainst by rotating impellers longitudinally disposed adjacent each side of the transporting means, and then rinsing the remaining foreign matter or muddy water from the surfaces of the fruits and vegetables by subsequently passing them through a washing stage wherein a plurality of fine sprays of clean water are projected against them whereby they become thoroughly cleansed.

A further object is to provide a washer particularly adapted for removing spray residue from the surfaces of fruit by first conveying the fruit through a soaking tank containing a solution which will dissipate spray residue and soften other foreign substances which may adhere to the surface of the fruit, and subsequently conveying the fruit through one or more impeller type washing stages, after which the fruit is conveyed through a spray type stage for rinsing.

A further object is to provide an impeller type washer means whereby soil, mud, and other foreign substances which may accumulate in the bottom of the impeller tank, may readily be removed or discharged therefrom into piles, or suitable receiving means disposed beneath the washer, said means being provided with a suitable control.

A further object of this invention is to provide a washer comprising a regulator for maintaining the water in the impeller section tank at a predetermined level, and another regulator for maintaining the solution in the soaking tank at a predetermined level.

A further object is to provide a washer having a spray section provided with a water tank or reservoir from which water is pumped into headers leading to the spray pipes, and means for causing the water to drain back into the storage tank or reservoir through screens, thereby making it possible for the water to circulate continuously with a minimum of loss, provision also being made for the removal of the screens for cleaning.

A further object is to provide a washer comprising in combination, a soaking tank, one or more impeller type sections, one or more spray sections, and an endless conveyer for transporting the fruit or vegetables through the washer, which conveyer may consist of a plurality of rollers constituting the load carrying means, with provision for rotating said rollers in a manner which will cause the articles being conveyed to be rotated so that their entire surfaces will be subjected to a more uniform action in the various stages, it being understood, however, that the invention is not limited to the use of a rolling roller type conveyer, as other types of conveyers such as the open mesh wire belt, etc., may be used. The type of conveyer to be used depends greatly upon the variety of fruit or vegetables to be washed.

Other objects of the invention will appear from the following description and accompanying drawings and will be pointed out in the annexed claims.

In the accompanying drawings there has been disclosed a structure designed to carry out the various objects of the invention, but it is to be understood that many modifications may be made in the design without departing from the scope of the invention, as set forth in the appended claims.

In the drawings:

Figure 1 is an elevational view of the receiving end of the machine, partially in section, showing the soaking tank and impeller sections;

Figure 2 is a view similar to Figure 1, showing the spray section and the means for driving the conveyer;

Figure 3 is a sectional plan view on the line 2—2 of Figure 1, showing the conveyer, impellers, and the water level regulators;

Figure 4 is a plan view of Figure 2, showing the spray section and the conveyer drive;

Figure 5 is a detail sectional view on the lines 5—5 of Figure 3, showing one of the water level regulators;

Figure 6 is a cross sectional view on the line 6—6 of Figure 3, showing the arrangement of the impellers and the means for controlling the projection of the water therefrom;

Figure 7 is a sectional detail plan view of a portion of the carrying belt chain and rollers;

Figure 8 is a detail sectional view showing the means for supporting and guiding the load carrying rollers and chain;

Figure 9 is a cross-sectional view on the line 9—9 of Figure 2, showing the means for receiving and conducting the water in the spray section into the settling tank beneath the machine, the dotted lines indicating the screen partially withdrawn;

Figure 10 is a detail sectional view on the line 10—10 of Figure 6, showing the means for controlling the projection of the water from the propellers;

Figure 11:
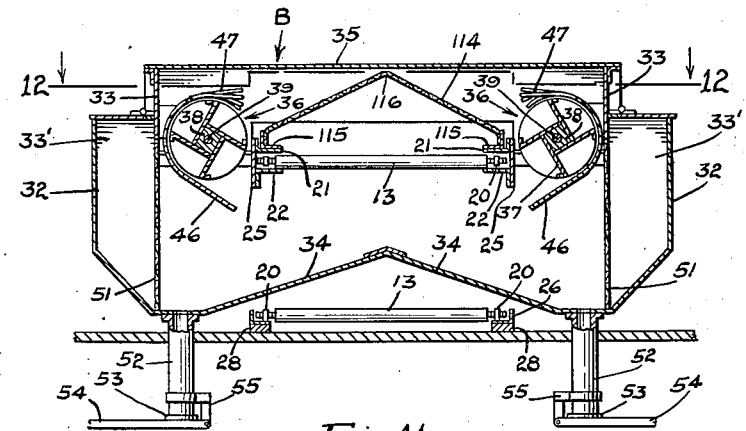
Figure 11 is a sectional view similar to Figure 6, showing a screen placed over the conveyer to break the force of the water.

Broadly, the fruit and vegetable washer herein disclosed comprises a soaking tank A, a double impeller section B, a spray section C and a picking or sorting table D.

*Soaking means*

The soaking means is best shown in Figures 1 and 3, and comprises a tank A having opposed side walls 1, end walls 2 and 3, and a floor or bottom wall 4. The side walls are reinforced by standards 5 which extend vertically in a downward direction to the floor, and support the tank A. The top of the tank is covered by suitable plates 6 having means to facilitate easy removal. The various elements of this tank are desirably made from a suitable solution-resisting material such as wood, enamel plates, or other sheets plated to resist chemical action.

The fruit and vegetables to be treated are transported through the entire washer unit upon an endless belt, indicated generally by the numeral 7. The receiving end of this belt is supported upon sprockets 8 secured to a shaft 9 journaled in suitable bearings 10, shown supported upon the side members 11 of a supporting structure indicated generally by the numeral 12. The belt 7, in the present instance, is shown comprising a plurality of load carrying rollers 13, having terminal sockets 14 adapted to receive extensions 15 provided upon pintles 16 of a pair of suitable conveyer chains 17, of well-known construction. The conveyer chains 17 comprise side bars 18 and 19 joined together by the pintles 16, as shown in Figures 7 and 8. Suitable rollers 20 are provided upon the pintles 16 between the side bars 18 and 19, adapted to travel upon suitable tracks, as will subsequently be described. The upper run or load carrying surface of the conveyer belt 7 is supported and guided by longitudinally extending inwardly facing L-shaped rail members 21 and 22.

The conveyor belt rollers are formed from wood or round bars or tubes and are adapted to rotate freely upon the pintle extensions 15. Formed on the inner side bars 18 of the chains are a plurality of studs 23, similar in form and dimensions to the pintle extensions 15. Suitable conveyor rollers 24, similar to the rollers 13, are mounted upon the studs 23 between the said rollers 13.

The rollers 13 and 24 constituting the upper run or load carrying surface of the endless belt 7, are rotated by frictional engagement with the inwardly projecting edge portions of the horizontal legs of the angle members 22, as will readily be understood by reference to Figure 8. The horizontal legs of the upper angle members 21 extend inwardly over the chains 7 and the end portion of the rollers 13 and 24, and function as guard members to prevent vegetables, fruit or foreign matter from getting into the working parts of the chain. Through the soaking tank A, the L-shaped guide rail members 21 and 22 may be secured directly to the side walls 1 thereof, and between the soaking tank and the discharge end of the machine, said members are united to form a unitary structure by suitable plate members 25.

The rollers of the lower or return run of the endless belt need not be rotated, and are therefore supported, as shown in Figure 6. To thus support the conveyor chains 17, suitable L-shaped tracks 26 are provided adapted to be engaged by the rollers 20 of the pintles 16. The tracks 26 are shown supported upon suitable blocks 28 secured to the floor. The vertical legs of the tracks 26 act as guide members to prevent lateral movement of the conveyor belt.

The conveyor belt 7, upon entering the soaking tank A, is guided in a downward direction to a lower level, and before emerging from said tank is guided in an upward direction to its former level. The level of the solution in the soaking tank A is indicated by the numeral 29, in Figure 1, whereby it will be obvious that articles carried into the solution by the conveyor belt, may be temporarily moved out of engagement with the conveyor rollers 13 and 24 by the buoyancy of the water, whereby the articles may float through the soaking tank. Incoming articles will keep forcing the articles in the tank in a forward direction, whereby they will be picked up by the belt rollers and removed from the soaking tank.

Impeller section

The impeller section is best shown in Figures 1, 3, and 6, and comprises a tank B having opposed side walls each comprising spaced apart wall sections 32 and 33, hopper bottoms 34, a cover plate 35, and end plate members 42. A plurality of impellers indicated generally by the numeral 36, are rotatably supported within the tank B upon suitable shafts 39, journaled in bearings 40 secured to cross members 41 within the tank. As shown in Figure 6, each impeller 36 comprises a plurality of blades 37 secured to sleeves 38 supported upon the shafts 39. The sleeves 38 are preferably square in cross section to facilitate attaching the blades 37 thereto. The impellers 36 may be driven from any suitable source of power such, for example, as combination motor and speed reduction units 43, having driving connections with the impeller shafts 39 by suitable couplings 44. The motor reduction units 43 are shown supported upon a structural frame 45.

The impellers 36 are driven in opposite directions, and in directions to cause the blades 37 to scoop up water from within the tank B, and carry it around suitable guide members or housings 46, which partially surround the impellers, and from the upper portions of which the water is discharged inwardly over the conveyor belt 7. The upper marginal edge portions of the impeller housings 46 are cut or slitted, as shown in Figures 3, 6, and 10, to form a plurality of contiguous fingers or strips 47. These fingers may be bent to different vertical positions, as shown most clearly in Figure 10, to control the projection of the water inwardly over the conveyor belt 7, as indicated by the arrows in Figure 6. For example, it has been found that if the fingers 47 are made about four inches (4") wide and bent so that the outer ends are at different heights, the volume of water discharged by the impellers will be more evenly distributed over the width of the conveyor belt, with the result that a greater turbulent or churning action of the water is obtained over the entire width of the belt.

The conveyer belt 7 is supported and guided through the impeller tank by portions of the L-shaped members 21 and 22 and the plates 25. These members are supported at the ends and at the middle of the tank B by suitable means, not shown.

The conveyer belt is guided in a downward direction to a lower elevation, upon entering the tank, and is raised to its normal elevation upon leaving the tank, in a manner similar to that shown for lowering the conveyer belt in the soaking tank A, with the exception that the belt is not lowered as much in the impeller section tank B as it is in the soaking tank. The primary purpose of lowering the conveyor belt in the impeller tank is to prevent the water from splashing through the openings in the plate members 42 which form the ends of the tank.

Cooling means

In preparing some vegetables and fruits for marketing, it is necessary that they be pre-cooled before packing. To accomplish this, provision has been made for cooling the water in the impeller section tank B, through which the fruits and vegetables must pass. The spacing apart of the wall sections 32 and 33 at each side of the machine, results in the formation of suitable compartments 33', into which suitable cooling means such as cakes of ice 50 may be placed, as shown in Figure 6. Communication between the compartments 33', and the main part of the impeller section tank B is established through suitable screens 51, which constitute the lower portions of the inner wall sections 33. By this arrangement, the cakes of ice in the compartments 33' cannot come in contact with the rotating blades of the impellers 36.

Mud eliminator

Another feature of the invention resides in the means provided for eliminating or removing mud from the impeller section tank B. Such means is shown in Figure 6, and comprises a pair of drain pipes 52, one at each side of the tank, and into which the accumulation of sediment and mud in the tank may be directed by the outwardly sloping bottom wall portions 34 thereof, when said pipes are open. The bottoms 34 of the impeller tank B are also sloped longitudinally or in a lengthwise direction of the machine, as shown in Figure 1 for the same purpose. The drain pipes 52 are provided with valves consisting of suitable cover plates 53 secured to lever arms 54 having their inner ends pivotally supported upon members 55 secured to the pipes 52. The opposite ends of the lever arms 54 are pivoted to vertically disposed members 56 which are swivelly connected to adjusting screws 57. The screws 57 are engaged with correspondingly threaded fixed nuts or elements 58 here shown secured directly to the floor, and suitable hand wheels 59 are provided upon the upper ends of said screws whereby they may be conveniently rotated to effect the opening and closing of the valves 53, whereby the accumulation of sediment and mud at the bottom of the impeller tank may be conveniently removed therefrom, as indicated in Figure 6. The soaking tank A is provided with a mud eliminator similar to the ones used in connection with the tank B of the impeller section, as shown in Figure 1.

In operation of the machine, the hand wheels 59 will be rotated to open cover plates 53 a suitable distance to permit the sediment of mud and other material to constantly drain from the impeller tank. The degree of opening of cover plates 53 will, of course, be governed by the amount of mud and other incrustations that accumulate in the tank, and the operator preferably adjusts the cover plates 53 so that the pipes 52 discharge the sediment as a relatively soft thick mass continuously, while the machine is in operation.

Water level regulator

The level of the water in the impeller tank B is maintained substantially constant by a water level regulator E, shown comprising a small tank 100 having a valve 101 mounted therein and provided with a float 102 adjustably secured to one end of a pivoted arm 103, the other end of which is operatively engaged with the movable stem of the valve 101, as best shown in Figure 5. The valve 101 is connected to a pipe 104 which is connected to a suitable source of water supply such as the usual water main. When the level of the water in the impeller tank drops, the valve 101 will be opened by operation of the float 102 to thereby cause additional water to be supplied to the tank 101 through the pipe 104. The tank 100 of the regulator E is in direct communication with the impeller tank B through an opening 105, provided in the end wall 42 of the impeller tank, and may be supported upon suitable supports 106.

A similar regulator F is also provided for maintaining the solution in the soaking tank A at a constant level, and as shown in Figure 3, comprises a similar tank 100, valve 101, float 102, and arm 103.

Suitable overflows are also provided for the soaking tank A and impeller section tank B. These overflows are best shown in Figures 1 and 3 and each comprises an elbow 107 secured in a wall of its respective tank and having a pipe connection 108 connected therewith, the opposite end of which is connected by suitable pipe fittings 109 to an upright pipe 110 provided with a cross member 111 in which suitable adjusting screws 112 are mounted. The pipes 110 pass through suitable elongated openings 113 provided in the floor, as indicated by the broken lines in Figure 3. By means of the adjusting screws 112, the inclined pipe connections 108 may be relatively adjusted to position the fittings 109 at the proper elevation at which it is desired to maintain the level of the water in the tanks A and B. The pipes 100 may be connected to suitable overflows, not shown.

Spray section

The spray section comprises a suitable tank C shown having suitable side walls 62, end walls 63, and inclined bottom plate members 64, the lower edges of which are disposed so as to drain the water precipitated onto said plates into a suitable screen 65, having longitudinally extending angle iron members 66 secured to the opposite sides thereof, adapted to engage a pair of fixed rails 66' secured to the side walls 67 of a suitable tank or box G, provided directly beneath the screen 65. The bottom of the tank G is defined by suitable plates 68, and end plates 69 form the ends of the tank. One of the end wall members 69 is shaped as shown in Figure 2 to permit the removal of the screen 65 for cleaning and other purposes. The bottom wall 68 of the tank G slopes outwardly from the center of the machine, in opposite directions, as shown in Figure 9, and suitable drain pipes 70 connect the tank G with a suitable settling tank or reservoir 71. The screen 65 is mounted for longitudinal movement upon the fixed rails 66' so that it may readily be removed from the machine for cleaning, as hereinbefore stated, and as indicated by the broken line in Figure 9.

Water delivered into the settling tank 71 from the drain pipes 70 of the screen tank G is pumped from the tank 71 through a suction pipe 72 connected to the intake side of a suitable pump 73, here shown as being of the centrifugal type and driven by a motor 74 coupled thereto by a suitable coupling 75. The water pumped from the settling tank 71 by the pump 73 is delivered to a header 78 through a series of interconnecting pipes 79, 80, 81, and 82, which connect said header with the discharge of the pump 73. A plurality of transversely disposed spray pipes 83 extend outwardly from opposite sides of the header 78 over the conveyer belt. The outer ends of the spray pipes 83 may be supported in suitable apertures provided in the side walls 62 of the spray tank C, as will be understood by reference to Figures 2 and 4. Each spray pipe may be provided with either a plurality of suitable apertures or suitable nozzles for projecting the water therefrom, in the form of a plurality of small jets or streams, onto the surface of the conveyer belt passing directly therebeneath, whereby fruits and vegetables being transported by said belt will be thoroughly rinsed before they are discharged from the spray tank C.

Similar streams or jets of water are projected upwardly from similar spray pipes 83' disposed directly below the upper run of the conveyer belt, as clearly shown in Figure 2. These lower spray pipes are connected to a similar header 78' which is connected to the lower portion of the pipe 80 by a suitable connection 79.

Sorting table D

The sorting table D is best shown in Figures 2 and 4, and consists merely of an open section of the conveyer belt, which is so disposed that attendants working along either side thereof may conveniently sort and pick out the culls from the fruit and vegetables, as the latter are transported from the spray section by the conveyer belt. The sorting table D may be made to any desired length, and in some installations, it may even be deemed advisable to omit it, it use being dependent upon whether a grader is used.

Conveyer drive

The means for driving the conveyer belt 7 is best shown in Figures 2 and 4, and comprises a pair of sprockets 85 secured to a shaft 86 supported in suitable bearings, not shown, mounted upon the uprights 87 of a suitable supporting structure indicated generally by the numeral 88. Upon the outer end of the shaft 86 there is secured a sprocket 89 which is drivingly connected to a similar sprocket 90 by a suitable driving chain 91. The sprocket 90 is secured to the low speed shaft of a speed reduction unit 92, the high speed shaft of which is coupled to a variable speed transmission 93 by a coupling 94. The opposite side of the speed reduction unit 93 is coupled to a motor 95 by a coupling 96. The speed reduction unit 92 may be any one of several well-known makes, which units are provided with changes of output speed.

For instance, the shaft at one end of the speed reduction unit may be connected to a motor having a full load speed of 1160 R. P. M., while the shaft at the opposite end thereof or the end connected to the speed reducer 92, may be driven at either a higher or a lower speed than 1160 R. P. M. In some units, the speed of the output shaft may be raised to 2320 R. P. M. or lowered to 580 R. P. M., thereby giving a speed change ratio of 4 to 1. All of the elements of the drive are mounted upon a plate member 97 secured to the top of the supporting structure 88. The L-shaped guide rail members 21 of the chains of the conveyer belt 7 are preferably extended around the sprockets 85 so that nothing can drop into the sprockets and chains. The lower portion of the conveyer belt is allowed to sag at the drive end of the machine, in the manner shown in Figure 2, whereby it will be unnecessary to provide additional means for taking up slack in the conveyer belt 7 to maintain it at the proper tension.

Figure 12:
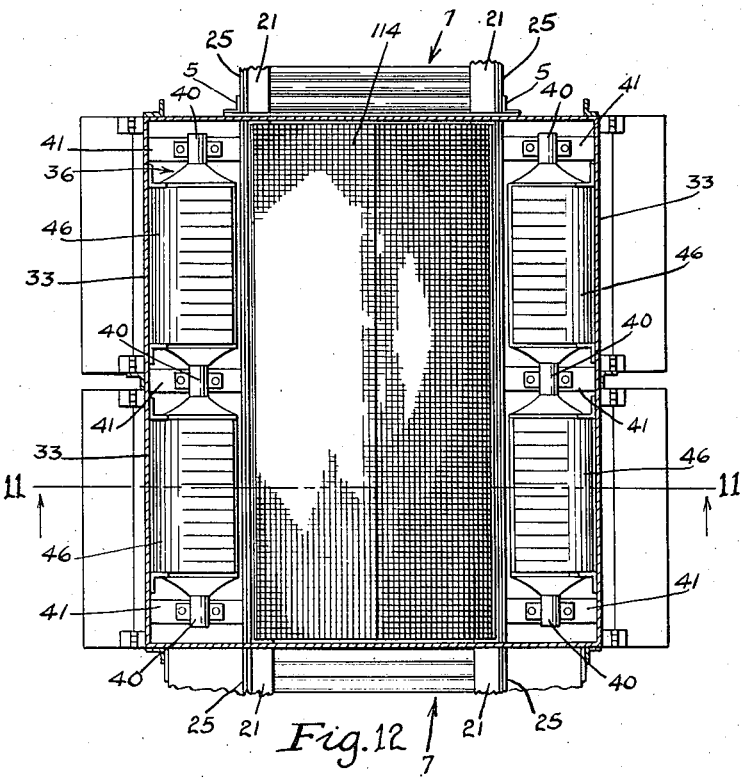
Figure 12 is a plan view of Figure 11.

To wash certain kinds of vegetables such, for example, as spinach, better results may be obtained if the water in the impeller section does not impinge too forcibly against the delicate leaves of the plants, which often results in tearing and mutilating the leaves. To prevent the water from thus forcibly impinging against the leaves, a suitable V-shaped screen 114 is interposed in the impeller section B and extends substantially from end to end thereof, as shown in Figure 12. The screen is preferably V-shaped in cross section, and is provided at its marginal edges with suitable angle iron rails 115 adapted to be seated upon and secured to the horizontal legs of the L-shaped members 21, forming the upper portions of the guides for the upper run of the conveyer belt 7. The screen 114 is detachably supported upon the L-shaped members 21, and may readily be removed therefrom when the cover plate 35 of the impeller section is opened or removed. The upper portion 116 of the screen terminates in close proximity to the cover plate 35, as best shown in Figure 11.

By means of the screen 114, the forces of the streams of water projected from the impellers 36 will be broken so that the water will be precipitated upon the vegetables being transported by the conveyer belt with little force, but in sufficient quantities to thoroughly wash and cleanse the vegetables. When washing other vegetables, the screen 114 may be removed so as to permit the turbulence of the water to act directly against the surfaces of the vegetables to thereby effect a thorough cleansing thereof.

Operation

In the operation of this novel fruit and vegetable washer, the articles are delivered onto the conveyer belt at the receiving end of the machine, shown at the left hand side of Figures 1 and 3, whereupon said articles will be transported through the solution in the soaking tank A, where field soil and other foreign substances adhering to the surfaces of the articles will be partially removed therefrom, and the remaining foreign substance adhering thereto will become so thoroughly softened that when the articles are subsequently delivered into the impeller section, the water projected against the fruits or vegetables by the action of the impellers 36, will completely dislodge and remove all foreign matter from the surfaces of the articles before they are delivered to the spray section C.

If it desired to thoroughly cool the fruit or vegetables before they are packed, the chambers 33' provided at the opposite sides of the tank B of the impeller section, may be supplied with ice or other suitable water cooling means, whereby the water in the impeller tank B, which is being constantly circulated therein by the impellers 36, will be thoroughly cooled. By thus spraying the fruit or vegetables with ice cold water, as they pass through the impeller section, they will be thoroughly cooled as well as cleansed before they are discharged therefrom into the spray section C of the machine. Any sediment such as field soil or mud which is removed from the fruit or vegetables in passing through the soaking tank and the impeller section will settle into the bottoms of the tanks A and B, from whence it may readily be removed by means of the mud eliminator valves 53, shown in Figures 1 and 6.

From the impeller section, the fruit or vegetables are delivered into the spray section C where they are subjected to the actions of the jets or sprays of water discharging from the spray pipes 63 and 83', whereby any foreign matter which may tend to adhere to the surfaces of the articles after leaving the impeller section, will be completely removed and discharged into the settlings tank 71 through the pipes 70, as clearly illustrated in Figure 2.

As most of the field soil and mud is removed from the articles before they reach the spray section, the water utilized in this section may be used over and over by the action of the pump 73. This pump is arranged so that it pumps the water from the settlings tank 71 and delivers it to the spray pipes 83 and 83', from whence it is projected onto the fruit or vegetables on the conveyer belt, and flows downwardly over the inclined bottom plates 64 of the spray section, and through the screen 65 and back into the settlings tank 71. The screen 65 is of a suitable mesh to prevent relatively coarse particles from being discharged into the tank 71. Foreign matter accumulating upon the screen 65 may readily be removed therefrom by simply removing the screen from its supports, as indicated by the broken lines in Figure 9.

From the spray section C, the thoroughly cleansed articles are transported over the open conveyer section D, where they may be sorted and picked over by workmen positioned along the sides of the conveyer.

The various parts and sections of the machine are so arranged and organized that when fruits and vegetables are passed through the machine, as hereinbefore described, they will be thoroughly cleaned, and so treated that they are ready for packing. In some instances, it has been found desirable to introduce saw dust or some other similar material in the water in the tank B of the impeller section, which material will be projected against the surfaces of the fruits or vegetables together with the water projected from the impellers 36, whereby a scrubbing action is obtained which has been found to effect a very thorough cleansing of the articles, even when treating articles which are exceedingly difficult to clean.

The construction of the upper marginal edge portions of the housings of the impellers 36 is important in that by adjusting the fingers or slitted portions 47, as shown in Figures 6 and 10, the projection of the water from the impellers may be controlled directionally, as indicated by the arrows in Figure 6, whereby the water may be sprayed over the entire width of the conveyer belt. It will also be noted by the arrows in Figure 6 that some of the streams of water projected from the impellers will impinge against one another along the center of the conveyer belt, whereby a great turbulence will be set up which will further assist in effecting a thorough cleansing of the articles being transported through the impeller section of the machine.

By means of the regulator E and F, the solution in the soaking tank A, and also the water in the impeller section tank B may be maintained at a predetermined level, and any loss of water as a result of the fruit or vegetables being passed through said tanks will be constantly replaced by the valves 101. The overflows 107 provided in connection with the soaking tank A and the impeller tank B, provide definite overflows for these tanks so that should the water level therein tend to rise above a predetermined level, it will discharge through the overflows 107, as will be clearly understood by reference to Figures 1 and 3.

In the drawings, we have shown the load carrying surface of the conveyer belt 7 as being constituted of a plurality of closely arranged rotatable rollers. Such a conveyer belt is desirable for handling various kinds of fruits and vegetables because the rotation of the rollers will constantly tend to rotate or turn the fruits or vegetables being transported by the belt, so that the entire surfaces thereof will be subjected to the actions of the cleaning fluids.

In some instances, however, it may be found desirable to use a conveyer belt constituted of a wire mesh, whereby the fruits or vegetables to be washed will be transported through the machine upon a closely woven wire mesh belt through which the field soil and other foreign matter adhering thereto may pass, when removed from the articles by the action of the water in the impeller and spray sections. It may be desirable in some installations to provide means by which the speed of the conveyer belt 7 may be varied, and this may readily be accomplished by the use of a variable speed motor, or other means capable of such speed variation, whereby the articles may be transported through the machine at a slower or a faster speed, as may be desired, which speed will be determined by the condition of the articles to be cleaned and the length of time necessary to effect a thorough cleaning and treatment of the articles.

While we have herein described the machine as a fruit and vegetable washer, it is to be understood that it may be used for washing various other articles without departing from the scope of the invention.

We claim as our invention:

1. An apparatus of the class described, comprising in combination, a soaking tank adapted to contain a suitable preliminary treating solution to loosen and soften incrustations on articles treated, an impeller section including a tank adapted to contain a suitable washing fluid, a rotary impeller means within the tank forming said impeller section, said impeller means extending longitudinally of said tank and being adapted to lift the washing fluid above the normal fluid level in said tank and project said fluid directly onto the articles, means associated with said impeller means for projecting the fluid in a plurality of streams directed tangentially downwardly over the articles to wash the loosened and softened incrustations therefrom, said fluid projecting means being angularly adjustable to vary the directions of said streams, and means for advancing articles to be washed through said soaking tank and impeller section.

2. An apparatus of the class described, comprising in combination, a soaking tank adapted to contain a preliminary treating solution to loosen and soften incrustations on articles being treated, an impeller section including a tank adapted to contain a suitable washing fluid, rotary impeller means disposed longitudinally along each side of the last mentioned tank, means for driving said rotary impeller means in a direction to cause the same to lift the fluid in said tank adjacent each side wall above the normal level of fluid therein and discharge the same toward the center of the tank tangentially downwardly over the articles being conveyed therethrough, means for projecting the fluid in a plurality of streams over said articles, said fluid projecting means being angularly adjustable to vary the elevation of said streams, and a single conveyer for advancing articles to be washed through said soaking tank and impeller section.

3. In an apparatus of the class described, a washing tank, a rotary impeller disposed longitudinally of and adjacent each side wall of said tank, means for driving said impellers in opposite directions to lift the fluid in said tank adjacent said side walls above the normal fluid level therein, an arcuate means closely overlying the upper portion of each impeller for directing the fluid lifted by said impellers in an unobstructed path toward the center of the tank and tangentially downwardly and directly over the articles to be washed with sufficient velocity to remove foreign matter from the articles being washed, and a conveyer disposed longitudinally of said tank between said impellers.

4. In an apparatus of the class described, a washing tank, a rotary impeller disposed longitudinally of and adjacent each side wall of said tank, means for driving said impellers in opposite directions to lift the fluid in said tank adjacent said side walls above the normal fluid level therein, a housing overlying the upper portion of each impeller for directing the fluid lifted by said impellers toward the center of the tank and tangentially downwardly over the articles to be washed, said housing having adjustable fingers projecting therefrom for directing the fluid in a plurality of streams over the articles, and a conveyer disposed longitudinally of said tank between said impellers.

5. A fruit and vegetable washing unit comprising a washing tank, a rotary impeller disposed longitudinally of and adjacent each side wall of said tank, a conveyer movable longitudinally of said tank and extending transversely between said impellers, means for rotating said impellers in opposite directions to lift the fluid in said tank adjacent said side walls above the normal fluid level therein, and an arcuate housing closely overlying the upper portion of each impeller, said impellers and housings serving to discharge the fluid with the full force of the inertia of the fluid and unbroken by obstructions toward the longitudinal center of the tank above the conveyer from opposite sides thereof, thereby to provide a continuously churning volume of fluid over the entire width of the conveyer and serving to remove foreign matter from the articles being washed.

WILLIAM L. DEAN.
FRANK S. LAMPARD.